(12) United States Patent
Freeman et al.

(10) Patent No.: US 10,697,315 B2
(45) Date of Patent: Jun. 30, 2020

(54) FULL HOOP BLADE TRACK WITH KEYSTONING SEGMENTS

(71) Applicants: Rolls-Royce North American Technologies Inc., Indianapolis, IN (US); Rolls-Royce Corporation, Indianapolis, IN (US)

(72) Inventors: Ted J. Freeman, Danville, IN (US); Aaron D. Sippel, Zionsville, IN (US)

(73) Assignees: Rolls-Royce North American Technologies Inc., Indianapolis, IN (US); Rolls-Royce Corporation, Indianapolis, IN (US)

(*) Notice: Subject to any disclaimer, the term of this patent is extended or adjusted under 35 U.S.C. 154(b) by 134 days.

(21) Appl. No.: 15/937,194

(22) Filed: Mar. 27, 2018

(65) Prior Publication Data

US 2019/0301296 A1    Oct. 3, 2019

(51) Int. Cl.
*F01D 25/24* (2006.01)
*F01D 11/08* (2006.01)
*F01D 25/00* (2006.01)

(52) U.S. Cl.
CPC .......... *F01D 11/08* (2013.01); *F01D 25/005* (2013.01); *F01D 25/246* (2013.01); *F05D 2220/32* (2013.01); *F05D 2240/11* (2013.01); *F05D 2300/6033* (2013.01)

(58) Field of Classification Search
None
See application file for complete search history.

(56) References Cited

U.S. PATENT DOCUMENTS

| | | | | |
|---|---|---|---|---|
| 5,141,397 A | * | 8/1992 | Sullivan | F04D 29/4233 285/319 |
| 5,167,488 A | * | 12/1992 | Ciokajlo | F01D 11/005 415/139 |
| 5,320,486 A | | 6/1994 | Walker et al. | |
| 6,270,311 B1 | * | 8/2001 | Kuwabara | F01D 11/005 415/110 |
| 6,705,832 B2 | * | 3/2004 | Tiemann | F01D 5/22 277/630 |
| 6,883,807 B2 | * | 4/2005 | Smed | F01D 11/005 277/641 |
| 6,893,215 B2 | * | 5/2005 | Kuwabara | F01D 11/005 415/115 |
| 7,445,425 B2 | | 11/2008 | Ferra et al. | |
| 7,562,880 B2 | * | 7/2009 | Paprotna | F16J 15/322 277/644 |
| 7,686,575 B2 | * | 3/2010 | Chehab | F01D 11/18 29/889.22 |

(Continued)

*Primary Examiner* — Michael Lebentritt
(74) *Attorney, Agent, or Firm* — Barnes & Thornburg LLP

(57) ABSTRACT

A blade track used in gas turbine engines to define an outer boundary of the primary gas path through a turbine section of a gas turbine engine is disclosed. The blade track includes segments comprising ceramic matrix composite materials that are assembled such that the blade track segments keystone against one another to provide a self-supporting full hoop assembly. Circumferentially-extending splines may be used to couple adjacent segments to one. Also disclosed are other heat shielding assemblies used in gas turbine engines that share features with the illustratively disclosed blade track.

17 Claims, 2 Drawing Sheets

(56) References Cited

U.S. PATENT DOCUMENTS

| | | | |
|---|---|---|---|
| 7,744,096 B2* | 6/2010 | Kono | F01D 11/005 |
| | | | 277/644 |
| 7,922,444 B2 | 4/2011 | Propheter-Hinckley | |
| 8,206,085 B2 | 6/2012 | Ammann | |
| 8,240,985 B2 | 8/2012 | Martin | |
| 8,322,977 B2* | 12/2012 | Beeck | F01D 11/005 |
| | | | 415/139 |
| 8,585,354 B1* | 11/2013 | Liang | F01D 11/008 |
| | | | 415/135 |
| 8,784,041 B2 | 7/2014 | Durocher et al. | |
| 8,845,285 B2* | 9/2014 | Weber | F01D 11/005 |
| | | | 415/173.1 |
| 8,905,708 B2 | 12/2014 | Weber et al. | |
| 8,967,951 B2* | 3/2015 | Klingler | F01D 25/246 |
| | | | 415/126 |
| 9,228,447 B2* | 1/2016 | McCaffrey | F01D 11/22 |
| 9,399,926 B2* | 7/2016 | Wiebe | F01D 11/08 |
| 9,416,675 B2* | 8/2016 | Lacy | F01D 11/005 |
| 9,447,696 B2* | 9/2016 | McCaffrey | F01D 11/18 |
| 9,920,644 B2* | 3/2018 | McKenna | F01D 11/005 |
| 10,267,171 B2* | 4/2019 | Dev | F01D 11/006 |
| 10,280,782 B2* | 5/2019 | McCaffrey | F01D 11/20 |
| 2009/0053050 A1* | 2/2009 | Bruce | F01D 25/04 |
| | | | 415/200 |
| 2010/0150703 A1* | 6/2010 | Gonzalez | F01D 9/04 |
| | | | 415/173.1 |
| 2010/0239415 A1* | 9/2010 | Turnquist | F01D 11/025 |
| | | | 415/174.2 |
| 2013/0022459 A1 | 1/2013 | Samudrala et al. | |
| 2015/0377035 A1* | 12/2015 | Freeman | F01D 11/12 |
| | | | 416/191 |
| 2016/0258304 A1* | 9/2016 | Sippel | F01D 25/246 |
| 2016/0319688 A1* | 11/2016 | Vetters | F01D 11/08 |
| 2017/0138597 A1* | 5/2017 | Freeman | F23R 3/007 |
| 2017/0204744 A1* | 7/2017 | Varney | F01D 25/246 |
| 2017/0350268 A1 | 12/2017 | McCaffrey | |
| 2018/0128282 A1* | 5/2018 | Rice | F04D 29/322 |

* cited by examiner

FULL HOOP BLADE TRACK WITH KEYSTONING SEGMENTS

FIELD OF THE DISCLOSURE

The present disclosure relates generally to gas turbine engines, and more specifically to blade tracks used in gas turbine engines to define an outer boundary of the primary gas path carrying hot, high pressure gasses through a turbine section of the engine.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies.

The blade tracks of static shrouds may have a full hoop, single-piece construction. However, the single-piece construction of such blade tracks presents a number of manufacturing challenges. As such, alternatives constructions of blade tracks that avoid gaps between adjacent segments remain an area of interest.

SUMMARY

The present disclosure may comprise one or more of the following features and combinations thereof.

A blade track adapted for use in a gas turbine engine is provided in this disclosure. The blade track may include a first blade track segment comprising ceramic matrix composite materials and a second blade track segment comprising ceramic matrix composite materials. The first blade track segment may be shaped to include a runner that extends partway around a central axis to define a portion of an outer boundary of a primary gas path. The second blade track segment may also shaped to include a runner that extends partway around a central axis to define a portion of the outer boundary of the primary gas path. A circumferential end of the runner included in the second blade track segment may contact a circumferential end of the runner included in the first blade track segment so that the second blade track segment provides a keystone for circumferentially supporting the first blade track segment.

In illustrative embodiments, the second blade track segment may be formed to include a spline-receiving slot shaped to open facing circumferentially toward the first blade track segment. The blade track may further include a circumferentially-extending spline that extends from the first blade track segment into the spline-receiving slot of the second blade track segment. The circumferentially-extending spline may be tight fit in the spline-receiving slot of the second blade track segment to couple the first blade track segment to the second blade track segment and resist circumferential movement of the second blade track segment away from the first blade track segment.

In illustrative embodiments, the first blade track segment is further formed to include a spline-receiving slot. The spline-receiving slot of the first blade track segment may be shaped to open facing circumferentially toward the second blade track segment. The circumferentially-extending spline may be tight fit in the spline-receiving slot of the first blade track segment.

In illustrative embodiments, the circumferentially-extending spline comprises metallic materials. The circumferentially-extending spline may have a radially-inwardly facing surface that is shielded at all points from the primary gas path by the runner of the first blade track segment and the runner of the second blade track segment.

In illustrative embodiments, the circumferentially-extending spline may be formed as part of a hanger. The hanger may include a coupler bracket that extends radially outward of the first blade track segment and the second blade track segment. The coupler bracket may be configured to attach the blade track to other components of the gas turbine engine.

In illustrative embodiments, the second blade track segment may be shaped to include a spline receiver that extends radially outward from the runner at a circumferential end of the runner and that defines at least a portion of the spline-receiving slot. The runner of the second blade track segment may have a substantially constant radial thickness. The runner of the second blade track segment may have a radially-outwardly facing surface that defines a side of the spline-receiving slot.

In illustrative embodiments, the first blade track segment may be further formed to include a spline-receiving slot shaped to open facing circumferentially toward the second blade track segment. The first blade track segment may be shaped to include a spline receiver that extends radially outward from the runner at a circumferential end of the runner and that defines at least a portion of the spline-receiving slot. The circumferentially-extending spline may extend into the spline-receiving slot of the first blade track segment. The circumferentially-extending spline may be tight fit in the spline-receiving slot of the first blade track segment to couple the first blade track segment to the second blade track segment and may resist circumferential movement of the first blade track segment away from the second blade track segment.

In illustrative embodiments, the first blade track segment may be an integral, co-infiltrated ceramic matrix composite component. The first blade track segment may be shaped to include the circumferentially-extending spline that is tight fit in the spline-receiving slot of the second blade track segment. The second blade track segment may be shaped to include a spline receiver that extends radially outward from the runner at a circumferential end of the runner and that defines at least a portion of the spline-receiving slot. The runner of the second blade track segment may have a substantially constant radial thickness and, in some embodiments, may have a radially-outwardly facing surface that defines a side of the spline-receiving slot.

In illustrative embodiments, the circumferentially-extending spline engagement with the second blade track segment may be configured to fix the second blade track segment such that the circumferential end of the runner included in the second blade track segment contacts the circumferential end of the runner included in the first blade track segment across the range of operating temperatures of the blade track.

According to another aspect of the present disclosure, a blade track adapted for use in a gas turbine engine may include a plurality of blade track segments arranged around a central axis. Each of the plurality of blade track segments may be made from ceramic matrix composite materials. Each of the plurality of blade track segments may be shaped to include (i) a runner that extends partway around the central axis and (ii) a spline-receiving slot that opens to face a circumferentially-adjacent blade track segment. The runner of each of the plurality of blade track segments has two circumferential ends that contact circumferentially-adjacent runners included circumferentially adjacent blade track segments across the range of operating temperatures of the blade track so that the each blade track segment provides a keystone for the circumferentially-adjacent blade track segments.

In illustrative embodiments, the blade track may include a plurality of circumferentially-extending splines. Each of the plurality of circumferentially-extending splines may be arranged to extend from one of the plurality of blade tracks into the spline-receiving slot of circumferentially-adjacent blade track segment. The circumferentially-extending splines may be tight fit in the spline-receiving slots and resist circumferential movement of the blade track segments.

In illustrative embodiments, each blade track segment may be shaped to include a spline receiver that extends radially outward from the runner at a circumferential end of the corresponding runner. The spline receiver may define at least a portion of the spline-receiving slot. The runner of the second blade track segment may have a radially-outwardly facing surface that defines a side of the spline-receiving slot.

Each of the plurality of circumferentially-extending splines may comprise metallic materials and may have a radially-inwardly facing surface that is shielded at all points from the central axis by the plurality of blade track segments. Each of the plurality of circumferentially-extending splines may be formed as part of a hanger. The hanger may include a coupler bracket that extends radially outward of the first blade track segment and the second blade track segment.

In illustrative embodiments, each of the circumferentially-extending splines comprises ceramic matrix composite materials. The circumferentially-extending splines may be co-infiltrated with matrix material along with the runner of one of the plurality of blade track segments so as to be fixed to one of the plurality of blade track segments.

According to another aspect of the present disclosure, a turbine engine assembly adapted to provide a heat shield around a central axis is disclosed. The assembly may include a first heat shield segment comprising ceramic matrix composite materials and a second heat shield segment comprising ceramic matrix composite materials. The first heat shield segment may be shaped to include a runner that extends partway around a central axis. The second heat shield segment may also be shaped to include a runner that extends partway around a central axis.

In illustrative embodiments, a circumferential end of the runner included in the second heat shield segment contacts a circumferential end of the runner included in the first heat shield segment so that the second heat shield segment provides a keystone for circumferentially supporting the first heat shield segment.

In illustrative embodiment, the second heat shield segment may be further formed to include a spline-receiving slot shaped to open facing circumferentially toward the first heat shield segment. The assembly may further include circumferentially-extending spline that extends from the first heat shield segment into the spline-receiving slot of the second heat shield segment. The circumferentially-extending spline may be tight fit in the spline-receiving slot of the second heat shield segment to couple the first heat shield segment to the second heat shield segment and to resist circumferential movement of the second heat shield segment away from the first heat shield segment.

In illustrative embodiments, the first heat shield segment may be further formed to include a spline-receiving slot. The spline-receiving slot of the first heat shield segment is shaped to open facing circumferentially toward the second heat shield segment. The circumferentially-extending spline may be tight fit in the spline-receiving slot of the first heat shield segment.

In illustrative embodiments, the first heat shield segment may be an integral, co-infiltrated ceramic matrix composite component. The first heat shield segment may be shaped to include the circumferentially-extending spline that is tight fit in the spline-receiving slot of the second heat shield segment.

These and other features of the present disclosure will become more apparent from the following description of the illustrative embodiments.

DETAILED DESCRIPTION OF THE DRAWINGS

Figure 1:
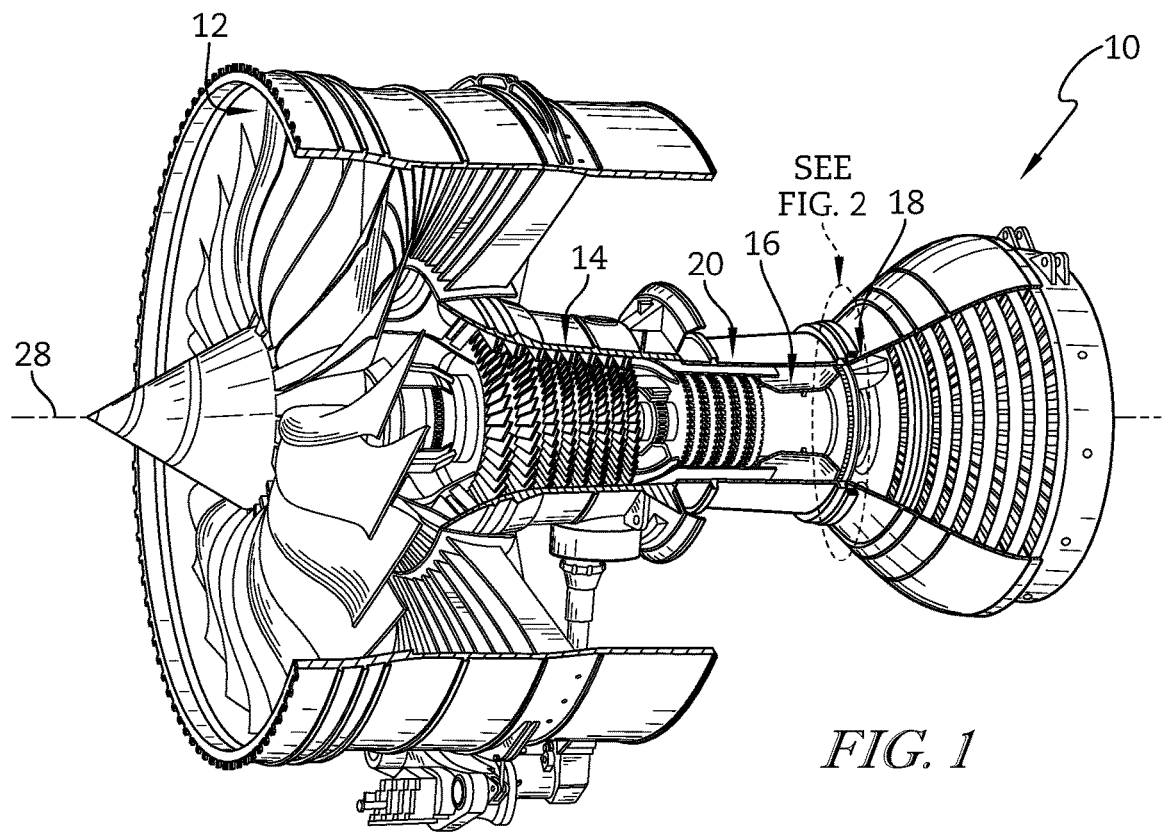
FIG. 1 is a cut-away perspective view of a gas turbine engine showing that the engine includes (from left to right) a fan, a compressor, a combustor, and a turbine.

For the purposes of promoting an understanding of the principles of the disclosure, reference will now be made to a number of illustrative embodiments illustrated in the drawings and specific language will be used to describe the same.

Blade track assemblies 24, 224, 324 according to the present disclosure include segments 41, 42, 43, 241, 242, 341, 342 to form a full hoop as suggested in FIGS. 2-5. The segments 41, 42, 43, 241, 242, 341, 342 are made from ceramic matrix composite materials designed to withstand relatively high temperatures along the primary gas path 40 of a gas turbine engine 10. The segments 41, 42, 43, 241, 242, 341, 342 circumferentially contact one another at all operating conditions so that each segment acts as a keystone for adjacent segments. In addition, the segments 41, 42, 43, 241, 242, 341, 342 are coupled to one another via tight-fit, circumferentially-extending splines 50, 250, 350. The combination of key stone support from adjacent segments 41, 42, 43, 241, 242, 341, 342 and circumferentially-extending splines 50, 250, 350 allow the blade track assemblies 24, 224, 324 to be self-supporting and to provide an uninterrupted heat shield around the primary gas path 40.

Turning specifically to FIG. 1, an illustrative aerospace gas turbine engine 10 is cut-away to show that the engine 10 includes a fan 12, a compressor 14, a combustor 16, and a turbine 18 all mounted to a case 20. The fan 12 is driven by the turbine 18 to provide thrust. The compressor 14 compresses and delivers air to the combustor 16. The combustor 16 mixes fuel with the compressed air received from the compressor 14 and ignites the fuel to produce hot, high-pressures gas. The hot, high-pressure gas produced from burning fuel in the combustor 16 is directed into the turbine 18, and the turbine 18 extracts work to drive the compressor 14 and the fan 12.

Figures 2, 3:
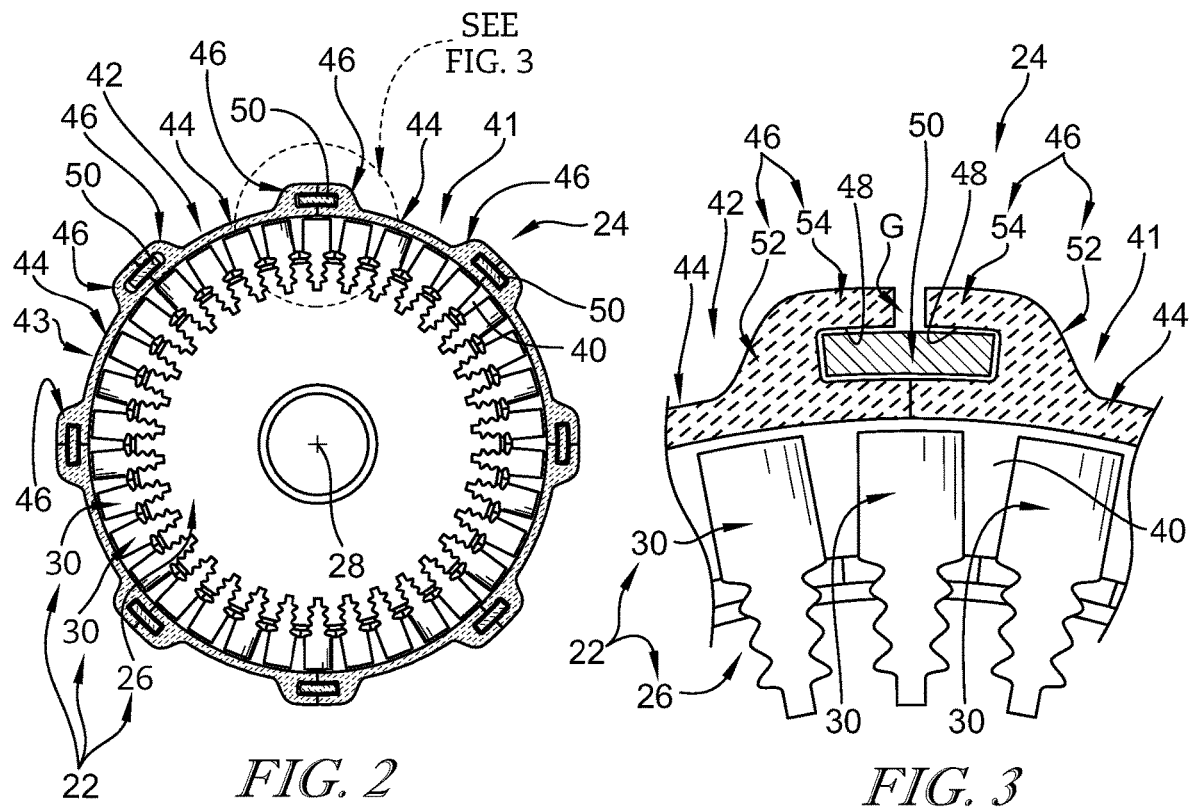
FIG. 2 is a front elevation view of a blade track included in the turbine of the gas turbine engine of FIG. 1 showing that the blade track has a plurality of ceramic matrix composite blade track segments coupled to one another via metallic splines that engage adjacent blade track segments as shown in FIG. 3.
FIG. 3 is detail view of a portion of the blade track in FIG. 2 showing that the circumferentially-extending splines are tight fit into slots formed in each blade track segment and showing that the radially-interior runner of each blade track segment engages the radially-interior runner of an adjacent blade track segment such that the blade track segments keystone against one another to provide a self-supporting full hoop assembly.

The turbine 18 illustratively includes a turbine wheel assembly 22 and a blade track 24 as shown in FIG. 2. The turbine wheel assembly 22 is adapted for rotation about a central axis 28 and includes a disk 26 and blades 30 coupled to the disk 26. Combustion products directed to the turbine 18 from the combustor 16 push the blades 30 to rotate about the axis 28. The blade track 24 extends around the turbine wheel assembly 22 to block combustion products from passing over the blades 30 without pushing the blades 30 to rotate about the axis 28.

The blade track 24 includes a number of ceramic matrix composite blade track segments 41, 42, 43 and a plurality of circumferentially-extending splines 50 as shown in FIGS. 1 and 2. The blade track segments 41, 42, 43 are arranged circumferentially adjacent to one another around the axis 28. The circumferentially-extending splines 50 couple the blade track segments 41, 42, 43 to one another so that the blade track segments 41, 42, 43 form a full hoop.

The blade track segments 41, 42, 43 are substantially identical and as shown in FIGS. 2 and 3. The segments 41, 42, 43 each include a runner 44 that faces a gas path 40 and a pair of spline receivers 46 arranged at opposed circumferential ends of the runner 44. The spline receivers 46 provide spline-receiving slots 48 at both opposed ends of the respective blade track segment 41, 42, 43 and are sized so that the splines 50 are tight fit within the spline-receiving slots 48.

The runner 44 of each blade track segment 41, 42, 43 extends partway around the central axis 28 and provides a heat shield for protecting components located radially outward thereof as shown in FIGS. 2 and 3. The runner 44 of each of the blade track segments 41, 42, 43 has opposed circumferential ends that contact opposed circumferential ends of circumferentially-adjacent runners 44 to provide a keystone for the circumferentially-adjacent blade track segments 41, 42, 43. It is appreciated that the opposed circumferential ends of the runners 44 included in each of the blade track segments 41, 42, 43 may move radially inwardly or circumferentially but that contact between the circumferential ends will be maintained. In the illustrative embodiment, the runner 44 of each blade track segment 41, 42, 43 has a substantially constant radial thickness as shown in FIGS. 2 and 3.

The runners 44 of the blade track segments 41, 42, 43 are shaped and manufactured from materials formulated so that the circumferential contact between adjacent blade track segments 41, 42, 43 and the keystone effect provided are maintained across the range of operating temperatures of the blade track 24. In illustrative examples, the range of operating temperatures of the blade track 24 may exceed 1500° F. This feature ensures that components radially outward of the runners 44 (including the splines 50) are shielded from temperatures and pressures in the gas path 40.

The spline receivers 46 of each blade track segment 41, 42, 43 illustratively extends radially outward from a corresponding runner 44 as shown in FIGS. 2 and 3. The spline receivers 46 each include a radially extending portion 52 and a circumferentially extending portion 54 as shown in FIG. 3. The circumferentially extending portions 54 of circumferentially-adjacent spline receivers 46 are spaced apart from one another to form a gap 55. In the illustrative embodiment, the radially extending portion 52 and the circumferentially extending portion 54 of the spline receiver 46 cooperates with a radially-outwardly facing surface of the corresponding runner 44 to define the spline-receiving slot 48.

The circumferentially-extending splines 50 are illustratively made from metallic materials as shown in FIGS. 2 and 3. In other embodiments, the splines 50 may be made from ceramic matrix composite materials, monolithic ceramic materials, or any other suitable material. The splines 50 are tight fit in the spline-receiving slots 48 of circumferentially-adjacent blade track segments 41, 42, 43 to couple the blade track segments 41, 42, 43 together and to resist circumferential motion of the blade track segments 41, 42, 43 away from one another. For purposes of this disclosure, tight fit means tightly tolerance to match the thickness of the splines 50 without being interference fit. However, it is contemplated that the splines 50 may be interference fit in the slots 48 in some embodiments.

The splines 50 are sized to be inflexible under typical loading in an engine and are thicker than strip seals. Specifically, the splines 50 may have a radial thickness of at least 40% of the thickness of the circumferentially extending portion 54 of the spline receivers 46. As noted above, the splines 50 each have a radially-inwardly facing surface 501 that is shielded at all points from the primary gas path 40 by the runners 44 of corresponding blade track segments 41, 42, 43.

According to a contemplated variation of the blade track 24, a single split-ring type construction could be implemented. This variation includes a single runner that forms a full hoop with a single circumferential split or interface where a spline 50 would couple the ends of the full hoop split ring.

Figure 4:
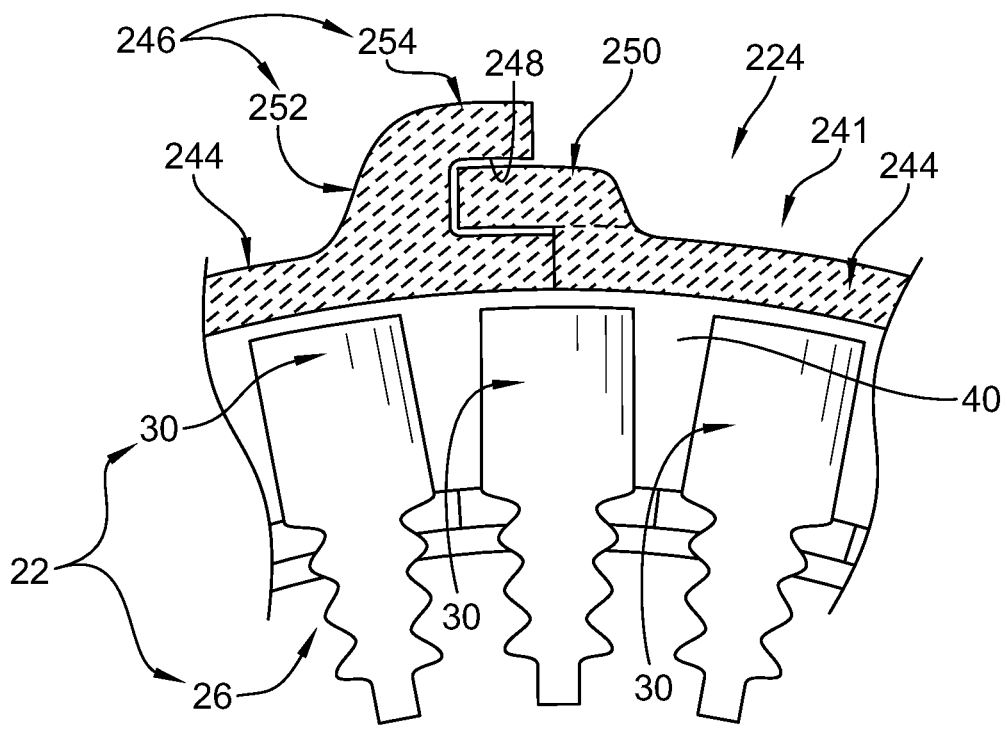
FIG. 4 is a detail view, similar to FIG. 3, showing a portion of a second blade track showing that the blade track has a plurality of ceramic matrix composite blade track segments coupled to one another via circumferentially-extending splines integrated into the manufacture of each blade track segment.

A second illustrative blade track 224 adapted for use with the turbine wheel assembly 22 is shown in FIG. 4. The blade track 224 is substantially similar to the blade track assembly 24 shown in FIGS. 1-3 and described herein. Accordingly, similar reference numbers in the 200 series indicate features that are common between the blade track assembly 24 and the blade track assembly 224. The description of the blade track assembly 24 and is hereby incorporated by reference to apply to the blade track assembly 224, except in instances when it conflicts with the specific description and drawings of the blade track assembly 224.

In the second illustrative embodiment, each blade track segment 241, 242 includes only one spline receiver 246 arranged at one circumferential end of the blade tracks segment 241, 242 as suggested in FIG. 4. At the circumferential end of each blade track segment 241, 242 opposite the spline receiver 248, a circumferentially-extending spline 250 is integrally formed via common ceramic matrix infiltration with the blade track segment 241, 242. The spline 250 is tight fit in a spline-receiving slot 248 to couple the blade track segments 241, 242 to one another so that the blade track segments 241, 242 form a full hoop.

According to a contemplated variation of the second illustrative blade track 224, a single split-ring type construction could be implemented. This variation includes a single runner that forms a full hoop with a single circumferential split or interface.

Figure 5:
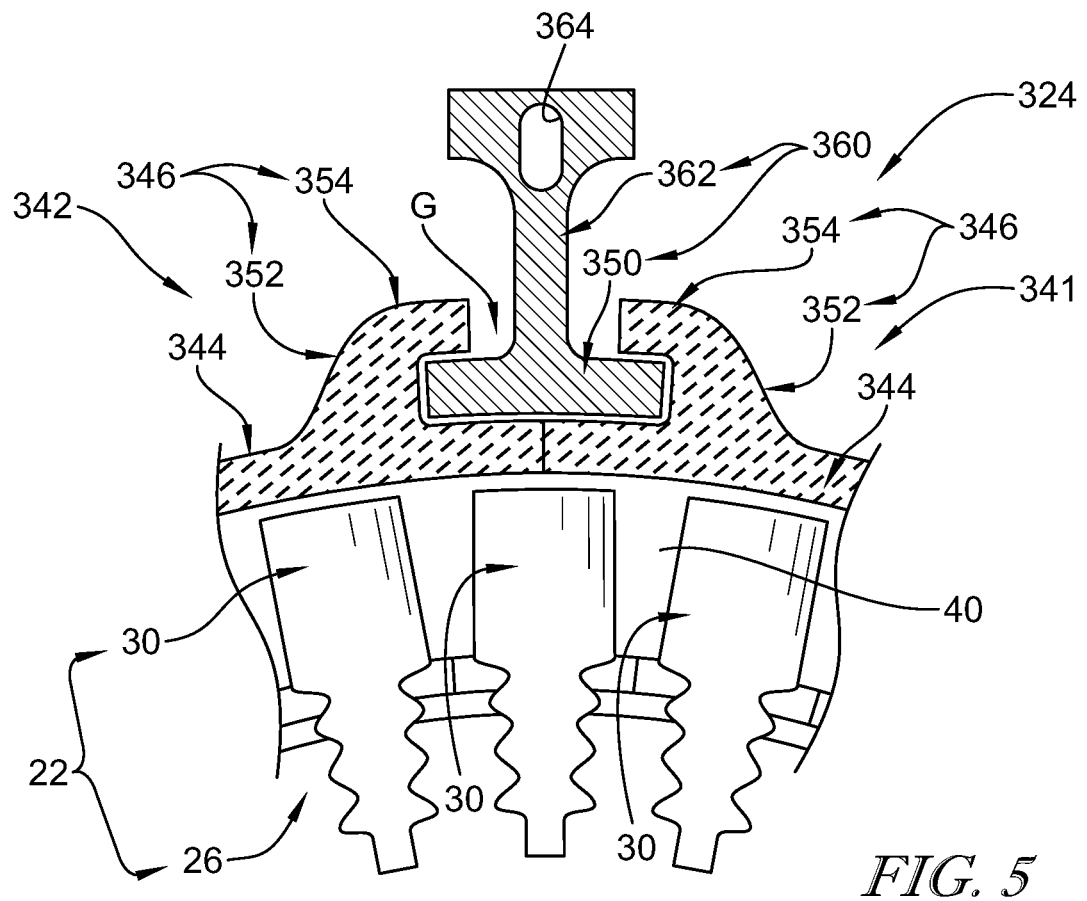
FIG. 5 is a detail view, similar to FIG. 3, showing a portion of a third blade track showing that the blade track has a plurality of ceramic matrix composite blade track segments coupled to one another via circumferentially-extending metallic splines integrated into hangers for mechanically attaching the blade track to other components of the gas turbine engine.

A third illustrative blade track 324 adapted for use with the turbine wheel assembly 22 is shown in FIG. 5. The blade track 324 is substantially similar to the blade track assembly 24 shown in FIGS. 1-3 and described herein. Accordingly, similar reference numbers in the 300 series indicate features that are common between the blade track assembly 24 and the blade track assembly 324. The description of the blade track assembly 24 and is hereby incorporated by reference to apply to the blade track assembly 324, except in instances when it conflicts with the specific description and drawings of the blade track assembly 324.

In the third illustrative embodiment, each circumferentially-extending spline 350 is formed as part of a hanger 360 as shown in FIG. 5. The hanger 620 includes a coupler bracket 362 configured to attach the blade track to other components of the gas turbine engine. The coupler bracket 362 extends radially outward from the spline 350, through the gap G between the spline receivers 346 of the blade track segments 341, 342, and radially outward of the blade track segments 341, 342. The coupler bracket 362 is further formed to include an attachment slot 364 that is elongated in the radial direction to facilitate coupling to other components of the gas turbine engine. It is contemplated that the hanger 360 may be used in place of one or a few of the splines 50 in the blade track 24 to provide for anti-rotation and/or mounting.

According to a contemplated variation of the third illustrative blade track 324, a single split-ring type construction could be implemented. This variation includes a single runner that forms a full hoop with a single circumferential split or interface.

It is appreciated that in an attempt to improve turbine 18 efficiency, combustor 16 outlet temperatures continue to rise to improve cycle efficiency and power density. Incorporation of ceramic matrix composite components into the turbine 18 offer the potential of reducing cooling air requirements due to their higher temperature capability and reducing engine weight due to their low density. One component being considered for insertion in future engines is turbine seal segments as described above.

Turbine blade track assemblies contemplated herein are generally segmented versions that provide an uninterrupted full hoop that faces turbine wheel assemblies. The blade track assemblies can key in on themselves and thus provide a self-supporting ring made of multiple segments.

In a first embodiment, illustrated as blade track assembly 24, the design utilizes a spline 50 to couple segments together. When the splines 50 are inserted, the segments 41, 42, 43 can form a full hoop. Inner and outer features of the spline slot 48 can be designed such that the inner features contact prior to the outer features. This will cause each segment 41, 42, 43 to act similar to a key stone and thus the system will be self-supporting. The spline 50 could be required to have a close tolerance with the groove 48 that it fits into to make sure that the system cannot move appreciably once assembled.

A second embodiment, illustrated as blade track assembly 224, is envisioned where the spline 250 is integrated into one of the circumferential ends of each segment 241, 242. The assembly 224 would work much like to the first embodiment without the need for a loose spline.

A third embodiment, illustrated as blade track assembly 324, can incorporate an I-beam or T shape component as the spline 350. This I-beam shape component could be used to contain an anti-rotation feature. It could work much like the first embodiment.

Variations on the shown embodiments are envisioned where there is only a single split ring with the spline holding features on both sides of the split. In this design, it is possible that there will be enough spring in the single piece split hoop that a blind slot can be machined, but it is possible that the ring will be stiff and the slot will need to be machined through from front to back and a retainer may be needed for the spline.

It is contemplated that assemblies used elsewhere in a gas turbine engine could incorporate the ceramic matrix composite segments described herein as heat shields in other parts of the engine. In some examples, it is appreciated that similarly mounted ceramic matrix composite segments could be used as combustion liner tiles in the combustor 16 or as exhaust liners to protect the exhaust nozzle from high temperatures. Accordingly, heat shields with self-supporting full hoop architecture is part of the present disclosure.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A blade track adapted for use in a gas turbine engine, the blade track comprising
a first blade track segment comprising ceramic matrix composite materials, the first blade track segment shaped to include a runner that extends partway around a central axis to define a portion of an outer boundary of a primary gas path,
a second blade track segment comprising ceramic matrix composite materials, the second blade track segment shaped to include a runner that extends partway around a central axis to define a portion of the outer boundary of the primary gas path and a circumferential end of the runner included in the second blade track segment contacts a circumferential end of the runner included in the first blade track segment so that the second blade track segment provides a keystone for circumferentially supporting the first blade track segment, wherein the second blade track segment is further formed to include a spline-receiving slot shaped to open facing circumferentially toward the first blade track segment, and
a circumferentially-extending spline that extends from the first blade track segment into the spline-receiving slot of the second blade track segment, wherein the circumferentially-extending spline is tight fit in the spline-receiving slot of the second blade track segment to couple the first blade track segment to the second blade track segment and resist circumferential movement of the second blade track segment away from the first blade track segment.

2. The blade track of claim 1, wherein the first blade track segment is further formed to include a spline-receiving slot, the spline-receiving slot of the first blade track segment is shaped to open facing circumferentially toward the second blade track segment, and the circumferentially-extending spline is tight fit in the spline-receiving slot of the first blade track segment.

3. The blade track segment of claim 2, wherein the circumferentially-extending spline comprises metallic materials and has a radially-inwardly facing surface that is shielded at all points from the primary gas path by the runner of the first blade track segment and the runner of the second blade track segment.

4. The blade track segment of claim 3, wherein the circumferentially-extending spline is formed as part of a hanger, the hanger includes a coupler bracket that extends radially outward of the first blade track segment and the second blade track segment, and the coupler bracket is configured to attach the blade track to other components of the gas turbine engine.

5. The blade track segment of claim 1, wherein the second blade track segment is shaped to include a spline receiver that extends radially outward from the runner at a circumferential end of the runner and that defines at least a portion of the spline-receiving slot.

6. The blade track segment of claim 5, wherein the runner of the second blade track segment has a substantially constant radial thickness and has a radially-outwardly facing surface that defines a side of the spline-receiving slot.

7. The blade track segment of claim 6, wherein the first blade track segment is further formed to include a spline-receiving slot shaped to open facing circumferentially toward the second blade track segment,
   wherein the first blade track segment is shaped to include a spline receiver that extends radially outward from the runner at a circumferential end of the runner and that defines at least a portion of the spline-receiving slot,
   wherein the circumferentially-extending spline extends into the spline-receiving slot of the first blade track segment, and
   wherein the circumferentially-extending spline is tight fit in the spline-receiving slot of the first blade track segment to couple the first blade track segment to the second blade track segment and resist circumferential movement of the first blade track segment away from the second blade track segment.

8. The blade track segment of claim 1, wherein the first blade track segment is an integral, co-infiltrated ceramic matrix composite component shaped to include the circumferentially-extending spline that is tight fit in the spline-receiving slot of the second blade track segment.

9. The blade track segment of claim 8, wherein the second blade track segment is shaped to include a spline receiver that extends radially outward from the runner at a circumferential end of the runner and that defines at least a portion of the spline-receiving slot, and
   wherein the runner of the second blade track segment has a substantially constant radial thickness and has a radially-outwardly facing surface that defines a side of the spline-receiving slot.

10. The blade track segment of claim 1, wherein the circumferentially-extending spline engagement with the second blade track segment is configured to fix the second blade track segment such that the circumferential end of the runner included in the second blade track segment contacts the circumferential end of the runner included in the first blade track segment across the range of operating temperatures of the blade track.

11. A blade track adapted for use in a gas turbine engine, the blade track comprising
   a plurality of blade track segments arranged around a central axis, each of the plurality of blade track segments comprising ceramic matrix composite materials and shaped to include (i) a runner that extends partway around the central axis and (ii) a spline-receiving slot that opens to face a circumferentially-adjacent blade track segment, wherein the runner of each of the plurality of blade track segments has two circumferential ends that contact circumferentially-adjacent runners included circumferentially adjacent blade track segments across the range of operating temperatures of the blade track so that the each blade track segment provides a keystone for the circumferentially-adjacent blade track segments, and
   a plurality of circumferentially-extending splines, each of the plurality of circumferentially-extending splines arranged to extend from one of the plurality of blade tracks into the spline-receiving slot of circumferentially-adjacent blade track segment, wherein the circumferentially-extending splines are tight fit in the spline-receiving slots and resist circumferential movement of the blade track segments.

12. The blade track segment of claim 11, wherein each blade track segment is shaped to include a spline receiver that extends radially outward from the runner at a circumferential end of the corresponding runner.

13. The blade track segment of claim 12, wherein the spline receiver defines at least a portion of the spline-receiving slot.

14. The blade track segment of claim 13, wherein the runner of the second blade track segment has a radially-outwardly facing surface that defines a side of the spline-receiving slot.

15. The blade track segment of claim 11, wherein each of the plurality of circumferentially-extending splines comprises metallic materials and has a radially-inwardly facing surface that is shielded at all points from the central axis by the plurality of blade track segments.

16. The blade track segment of claim 15, wherein each of the plurality of circumferentially-extending splines is formed as part of a hanger, the hanger includes a coupler bracket that extends radially outward of the first blade track segment and the second blade track segment.

17. The blade track segment of claim 11, wherein each of the circumferentially-extending splines comprises ceramic matrix composite materials and is co-infiltrated with matrix material along with the runner of one of the plurality of blade track segments so as to be fixed to one of the plurality of blade track segments.

* * * * *